March 31, 1931. J. BARANSKI 1,798,717
ANIMAL TRAP
Filed Feb. 4, 1929  2 Sheets-Sheet 1
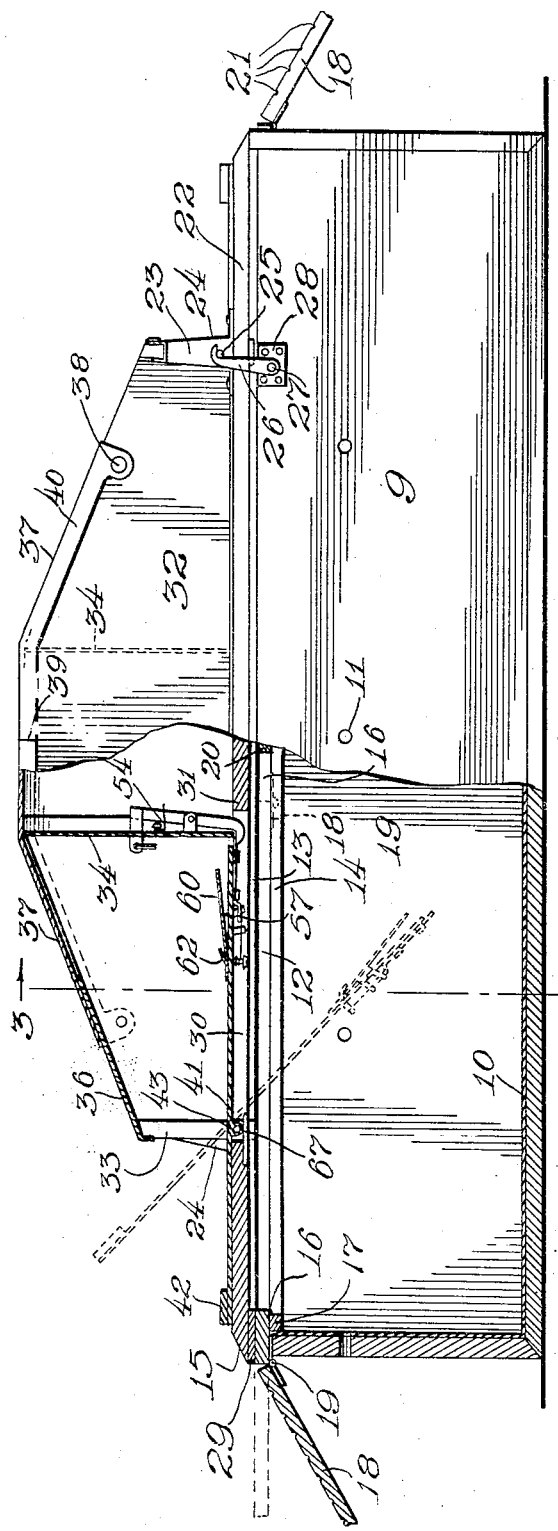
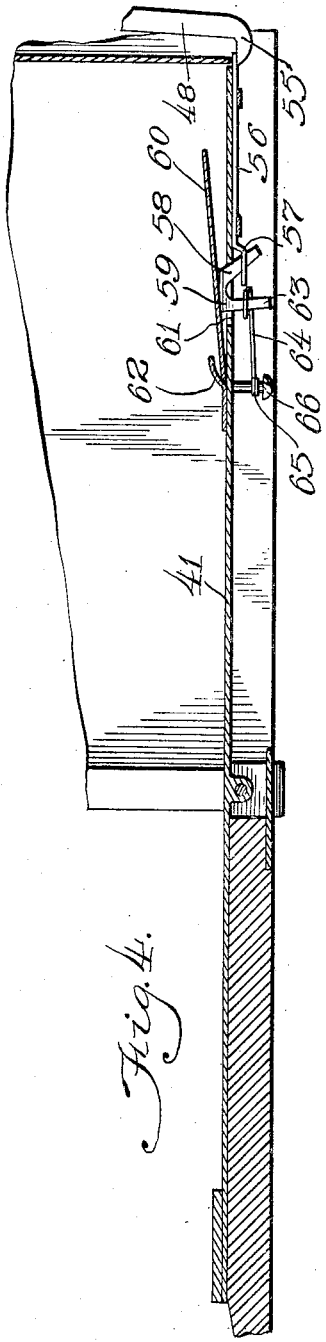
Inventor:
J. Baranski.
By B. Pilchowicz,
Atty.

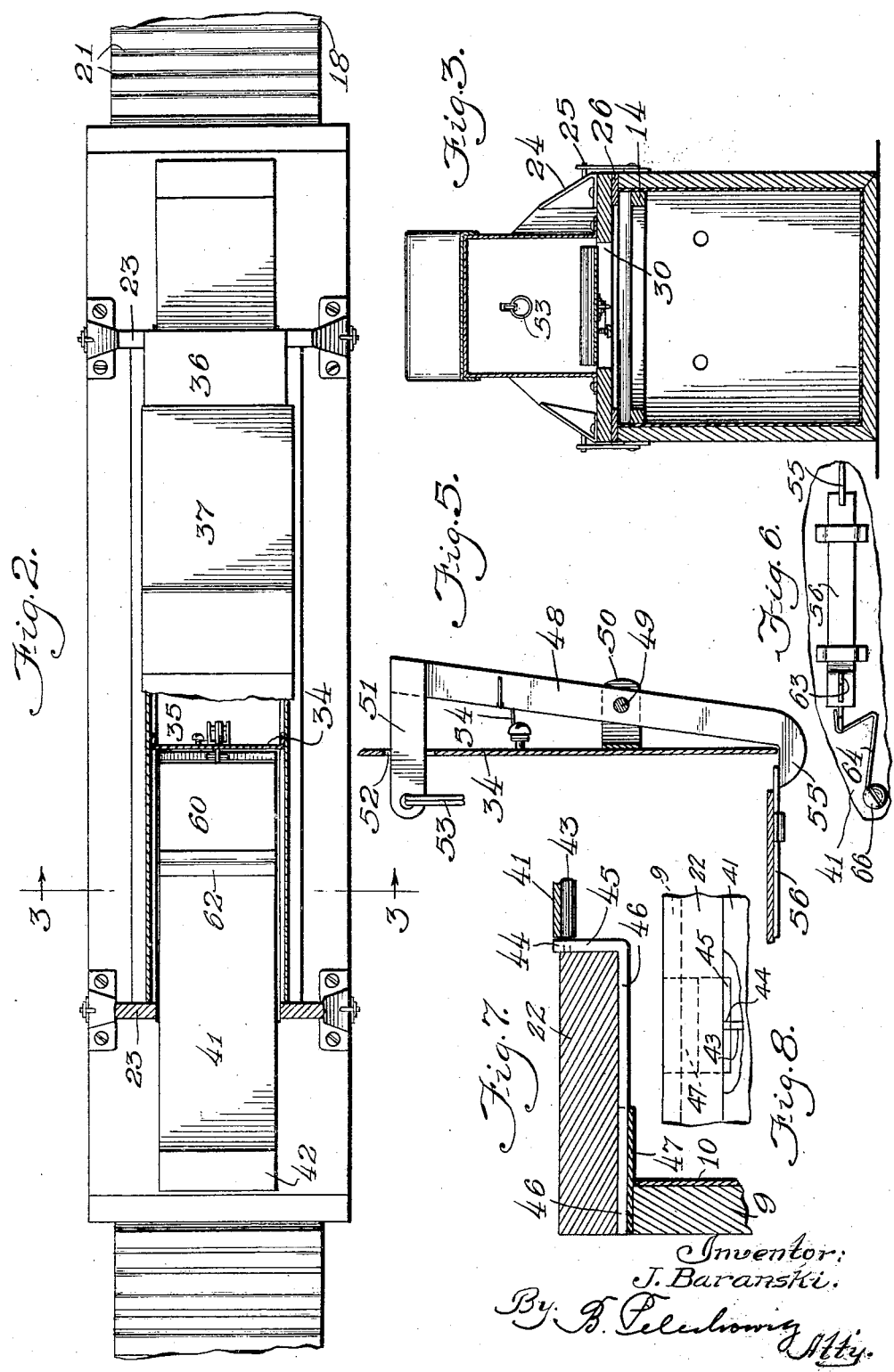

Patented Mar. 31, 1931

1,798,717

UNITED STATES PATENT OFFICE

JULIAN BARANSKI, OF FLORENCE, NEW JERSEY

ANIMAL TRAP

Application filed February 4, 1929. Serial No. 337,238.

This invention relates to a trap for catching rats and other rodents, and which relates to a trap of that type in which the animal approaches the bait upon a movable platform and when attempting to obtain the bait, releases the platform and is precipitated into a container or cage from which the animal cannot escape, and may be safely kept until removed.

The invention further consists of a rat trap which is provided with extensible runways providing approaches to a platform pivoted upon the top of the cabinet, forming the container or cage of the trap and disposed over openings in the top of the cabinet, while a casing or cover is provided over the inner ends of the platforms having entrance openings for the rats or other rodents in approaching the inner ends of the platforms, while disposed adjacent the inner ends of the platforms and preferably between the two are mounted bait holders with catches cooperating with releasable sliding bolts mounted upon the platforms, the platforms being provided with auxiliary pivoted platforms upon which the rodent in attempting to obtain the bait will ordinarily step resulting in the release of the bolts from the catches and due to the over-balancing weight of the rodent upon the main platform the rodent will tilt the same and be precipitated into the cage. If by any means the bolts should not be retracted or released by depression of the tread members or auxiliary platforms, the release of the platform is insured by release of the catches in the attempt of the animal to obtain the bait. By this construction double means are provided to positively insure release of the platforms and precipitation of the rodent into the cage, and the rodent will therefore be doubly prevented from escaping after once having entered upon the platform.

A further object of the invention is to provide a sectional trap which may be readily set up in position and in which the top thereof supports the bait pivoted platforms and releasing mechanism and is provided with means for obtaining access to the bait holding devices for applying the bait when the device is set up or obtaining further access to the platform and catches thereof by removing the top or cover as well as facilitating the removal of the rodents which have been caught in the trap, and which when the parts are assembled will be positively held in position, while the extensible approaches or run-ways may be confined within the area of the cabinet by sliding the same into the ends thereof. The cabinet or cage part of the trap is provided with a metallic lining to prevent the rodents from gnawing their way out or escaping, but means is provided for ventilating the cage so that the rodents may be supplied with air whereby they may be kept alive.

With the above general objects in view and others that will appear as the nature of the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views, Fig. 1 is a side elevational view partly in section of my novel trap;

Fig. 2 is a top plan view showing the casing of one of the bait holding devices, the inner ends of one platform and its catches in section;

Fig. 3 is a vertical sectional view taken on section lines 3—3 of Figs. 1 and 2;

Fig. 4 is an enlarged fragmentary sectional elevation taken longitudinally of one of the platforms with its adjacent parts;

Fig. 5 is an enlarged vertical sectional view of one of the catches;

Fig. 6 is a bottom view thereof;

Fig. 7 is an enlarged sectional view showing the manner of mounting the pivoted platforms; and Fig. 8 is a partial plan view of the structure shown on Fig. 7.

Referring to the drawings in detail, the trap as shown, comprises an elongated rectangular cabinet structure 9 which may be of wood and which is provided with a sheet metal lining 10 designed to prevent the rodents from gnawing their way through the walls of the cabinet. This cabinet forms a container or cage of the trap in which the rodents are retained after being caught and ventilating openings 11 are provided in suitable points through the walls including the lining so that the rats or other rodents may obtain air and thereby be captured alive.

The top of the cabinet is opened and has arranged along opposite sides thereof adjacent its top edges, suitable longitudinal grooves 12 forming guide ways which are produced by upper and lower pairs of strips 13 and 14, the upper strips being secured to the top edges of the sides of the cabinet and the lower strips being secured to the lower ends thereof. This provides slots 15 at the ends of the cabinet communicating with said guide ways to receive slides 16 having cleats 17 mounted on the bottom thereof to engage the end walls of the cabinet and constituting stops to prevent displacement of the slides or strips 16. These slides serve as mounting means for inclined approaches or run-ways 18 which are hinged thereto as at 19 and are thus mounted to be slid into the guide-ways 12 limited by engagement of the slides 16 with stops 20 disposed in the guide ways 12 intermediately of the lengths thereof. This is the collapsed position of the run-ways when not in use. When the run-ways are in use they are projected or pulled out as indicated in Figs. 1 and 2 of the drawings, when they may be dropped down to an inclined position with the ends thereof engaging the front or other surface upon which the trap is supported so that the approach of the rodents to the entrances of the trap is facilitated. These run-ways are preferably corrugated as indicated at 21 to facilitate traction or walking of the rodent upon same.

As previously stated, the top of the cabinet is left open but is adapted to be closed by a removable cover or lid 22 which constitutes in fact a base for the mechanism mounted upon the cabinet in addition as will now be described. In order to secure the top or cover in position blocks 23 are arranged transversely of the cover a short distance from each end and suitably braced thereto as indicated at 24 as well as carrying notched keepers or pins 25 adapted to be engaged by catches or hooks 26 pivoted as at 27 on plates 28 mounted on the sides of the cabinet below the top thereof. This provides detachable means for securing the cover in position so that when braced it will be positively held from displacement, but may be readily removed when desired if for instance to obtain access to the mechanism of the trap, as will be further described. In order to close the ends of the spaces or slots above the run-ways 18, and the cover 22, suitable strips or cleats 29 are attached to the bottom of the cover near each end and these cleats are shorter than the width of the cover to space its ends from the side edges of the latter, so that they fit the upper strips 13.

The cover 22 is provided with entrance openings or slots 30 in the top thereof spaced apart by an intermediate wall portion 31 and also spaced from the ends of the cover as clearly indicated in the drawings so that platforms are provided on the ends of the cover approached by the run-ways 18. Upon the intermediate portion of the cover or top 22 and terminating at the outer ends of slots 30 is a casing 32 having side walls anchored to the opposed inner edges of the blocks 23 thus providing entrance openings 33 at the ends of the casing 32. This casing is narrower than the cover 22 and at the inner ends of the openings 30 or adjacent the ends of the intermediate portion 31 of the cover within the casing 32 are arranged a pair of transverse partitions 34 providing an intermediate compartment 35 accommodating certain parts of the bait holding devices and catches which will be more fully described. The ends of the casing 32 are closed by top sections 36 and the intermediate portions have hinged covers or doors 37, pivoted at their outer ends as shown at 38 to the sides of the casing 32 and meeting at their inner edges as indicated at 39 thus closing the top of the casing 32. Doors 37 overlap the inner ends of the top portions 36 as shown more particularly on Fig. 1 of the drawings, and the side flanges 40 depend to embrace the sides of the casing and at the same time frictionally hold the doors closed.

Pivoted between the blocks 23 so that their outer portions project over the platforms at the ends of the top or cover 22 beyond the ends of the casing 32 are movable or pivoted platforms 41 and the outer ends of these pivoted platforms are weighted as at 42, while the inner portions thereof extend over the openings 30. In order to pivot the platforms 41 the pivots 43 thereof are fixed to the bottom faces of the platforms outwardly of their longitudinal centers, that is, slightly nearer their outer ends than their inner ends engaged in bearings 44 at the sides of the openings 40 formed by the forked or notched up-turned inner ends 45 of strips 46 secured to the bottom of the cover 22 and suitably braced thereto as indicated at 47, all as shown in Fig. 7 of the drawings.

The transverse partition 34 supports catches and bait holders and for this purpose vertically disposed angular catches or levers 48 are pivoted as at 49 to rest slightly below their longitudinal centers in vertical planes slightly inclined inwardly at their upper ends to pivot ears or brackets 50 secured to the partitions 34 and the upper ends of the catches or levers 48 having forwardly extending arms 51 which project through slots 52 in the partitions 34 and at their outer ends are provided with spring rings or other bait holding device, preferably in the form of coils as indicated at 53 to which the bait may be easily applied upon opening the doors 37. Springs 54 are mounted on the partitions 34 and the spring arms thereof engaged in notches in the upper arms of the lever or catches 48 so as to normally hold the upper ends of the lever inwardly and the lower ends thereof outwardly with their nose portions or catches proper 55 projecting under and in front of the partitions 34 at the lower edges of the latter, as clearly shown on Figs. 1 and 5 of the drawings. Cooperating with these catches are bolts 56 slidably mounted against the bottom faces of the platforms 41 at the inner ends of the latter in the openings 30. The outer ends of these sliding bolts are off-set downwardly as indicated at 57 and apertured to movably receive the inclined inner arm 58 of a forked arm 59 rigidly secured to the bottom of a tread member or auxiliary platform 60 mounted over the inner portions of the pivoted platforms 41. The platforms 41 have slots 61 through which the forked members 59 extend and the outer edges of the tread members or auxiliary platforms 60 pivoted beneath angular strips or brackets 62, secured across the top face of the platforms 41 and may be soldered or riveted thereto since all of these parts are preferably of metal. The other arms 63 of the fork members 59 normally extend down substantially vertically and are embraced or engaged by spring arms 64 of coil spring 65 mounted upon headed pins 66 depending from and rigidly anchored to the platforms 41, while the other ends of the springs are anchored to the bottom faces of the platforms also.

In the use of the device, the bait is applied to the holders or coil spring rings 53 by lifting the doors 37 and then the doors are closed. The approaches or run-ways 18 having been extended into operative positions, the animal may approach the trap so as to pass over the pivoted platforms 41. Normally the weights 42 hold the platform 41 in the position, shown in full lines in Figs. 1 and 4 of the drawings with the nose portions of catches proper 55 engaging beneath the projecting sliding bolts 56 as also seen in Fig. 5. As previously stated, the springs 54 hold the levers 48 with the catches 55 in this position while the springs 65 operating upon the forked members 59 normally elevate the inner ends of the auxiliary platforms or tread members 60 a slight degree above the top face of the platforms 41 upon their pivots or in angular relation to the platforms 41 as distinct from a position resting flat against the same and thus the inner arms 58 are moved inwardly to project the sliding bolts 56 beyond the inner of the platforms 41. Therefore, as the rat or rodent approaches the inner portions of the platforms 41 beyond the pivots 43, said platforms are supported and retained in horizontal position over the openings 30 until the rodent treads upon the auxiliary platform 60 in attempting to obtain the bait. In doing so, the tread member or auxiliary platform 60 is depressed against the action of its spring 65, thus swinging the corresponding arm 58 downwardly and inwardly through the slot 61 to draw in or retract its connected bolt 56 with a result that the inner end of the bolt is displaced from over the nose of the catch or lever 48 thereby releasing the inner end of the platform and causing it to swing down to the dotted line indicated in Fig. 1, thereby precipitating the animal into the cage part of the trap from which escape is prevented owing to the return of the platform under the action of the weight 42 to its normal horizontal position as shown in solid or full lines covering the opening 30. In so doing, the bolt 56 will light on the handle or convexed edge of the nose portion 55 to cause the catches to reengage. In this position the catches will hold the platform from swinging down and the platform ends of the cover 22 will prevent them from swinging up. As a dual means of absolutely insuring the release of the platforms should the catches not release by depression of the tread members or auxiliary platforms 60 by the most unusual circumstances or some unaccountable reason, the rodent in grabbing at the bait will pull on the upper arm of the lever 48 against the action of the spring 54 and thus swing the lower end inwardly to disengage the nose portion 55 from the bolt 56 thereby releasing the platform. By setting the lever 48 in inclined positions while still in a vertical plane as heretofore noted, the swinging of the upper end or arm of the upper lever is permitted to provide sufficient clearance for the disengagement or release of the nose portion 55 from the projected end of bolt 56. Once the rats or other rodents are caught they will be prevented from escaping and therefore may be captured alive. Owing to the knocked-down character of the trap or its sectional construction it may be readily assembled as well as set up for use or packed when not in use. The removable cover provides means for obtaining access to the interior or cage of the trap and it should be noted that when the cover is removed the slides 16 will be inwardly displaced so that the runways 18 cover the top opening of the cabinet and thus provide an auxiliary cover for the cage. However, this auxiliary cover may be opened to the desired degree for capturing the rodents or for putting some form of poison into the cage for the killing of the rodents until removed should this be desired. The intermediate portion 31 of the top or cover 22 is preferably notched to accommodate the ends 55 of the lever 48 and arms 67 are attached to the bottom of cover 22 at the outer ends of the openings 30 to be engaged by the platforms 41 when swung downwardly as indicated in dotted line on Fig. 1 of the drawings, so as to form stops to limit this downward movement and prevent the platforms from over-balancing or moving past the dead center, thereby insuring the return of the platforms to normal or closed positions under the action of the counterbalancing weights 42 as already described.

While there is described herein a preferred embodiment of the present invention, it is nevertheless to be understood that minor changes may be made therein without departing from the spirit and scope of the invention as claimed.

What I claim as new is:

1. In a trap of the class described, a cage, a cover for the cage, approaches for the cage, said approaches being movably mounted to be disposed in a position of concealment or to be withdrawn to provide runways, a casing mounted on the cover, said cover having openings therein and the casing having entrance openings leading over the openings in the cover, movable platforms pivoted to the cover and projecting over the openings, and catches cooperative between the casing and the platforms having bait holding devices and dual releasing means.

2. In a trap of the class described, a receptacle provided with a cover having an opening, a slidable member carried by the receptacle and movable to a position forming a runway leading to the opening, a casing over the opening having a vertical wall and an entrance opening leading over the opening in the cover, a catch pivoted on the vertical wall and having a bait holder projecting therethrough, a platform pivoted on the cover at the opening and having counterbalancing means projecting over the cover beyond the entrance opening, a depressible member mounted on the platform, a sliding bolt mounted on the platform and normally projecting to engage the catch, said slidable bolt having operative connection with the depressible member so as to be released upon depression of said member, the inaction thereof as a releasing means and pulled upon the catch in the attempt of the rodent to obtain the bait, causing the releasing of the catch from the bolt to permit the platform to drop.

3. In a rat or rodent trap, a cabinet having guide ways at the opposite sides of the top portion thereof, members slidable in said guide ways to be extended therefrom to provide approaches to the top of the cabinet, a casing removably mounted on the top of the cabinet, having an entrance opening at each end, pivoted platforms mounted on the top of the cabinet with their inner ends projecting over openings therein and their outer portions weighted and adapted to rest normally upon the top of the cabinet, and catches carried by the casing and platforms, respectively, and cooperating to normally hold the platforms in the position stated and constituting a dual releasing means therefor as well as bait holders.

4. In a rat or rodent trap, a cabinet having guide ways in the top portion thereof, members slidable in said guide ways, and having run-ways connected thereto to be withdrawn from the guideways to provide approaches to the top of the cabinet, a removable cover for the cabinet, said cabinet having a metallic lining and ventilating openings therein, a casing on the cover having entrance openings, the ends of the casing terminating at spaced points from the ends of the cover to provide platforms to which said run-ways lead, partitions arranged in the casing, doors over the top of the casing for obtaining access thereto, catches mounted on the partition and having portions projecting through the partitions, bait holders carried by said last named portions, platforms pivoted on the cover and forming trap doors over the openings and provided with weights to hold them in position to close the openings in the cover, and depressible means mounted upon the platforms and having means normally engaging the catches to retain the platforms in position stated until released by depression of said members or disengagement of the catches by pulling upon the bait holders, said depressible means constituting auxiliary platforms upon the first named platforms.

5. In a rat trap, a cage, runways slidably mounted in the top of the cage and adapted to be extended down in inclined positions from the end of the cage, a removable cover for the cage and having openings therein, tilting platforms normally closing said openings, covering means for the platforms over the openings, and catches between the platforms and the covering means and having bait holders, said catches being released by treading on the platforms over the openings or by pulling the bait holders to precipitate the rats into the cage, said runways closing the top of the cage when the cover is removed.

6. In a rat trap, a cage, runways slidably mounted in the top of the cage and adapted to be extended down in inclined positions from the end of the cage, a removable cover for the cage and having openings, covering means for the platforms over the openings, catches to hold the platforms normally horizontal to cover the openings in the cover and bait holders carried by the covering means, said catches being released when the rat attempts to obtain the bait, to swing down and precipitate the rats into the cage, said runways closing the top of the cage when the cover is removed.

7. A rat trap comprising a receptacle having an open top, a plurality of runways slidable to positions of concealment over the top or to positions forming approaches to the top, a removable cover for the open top of the receptacle having openings therein leading to the receptacle, a housing on the cover formed with a top and side walls, and a central partitioning member constituting a wall between the openings in the cover, the ends of the housing being open to permit access to the openings in the cover by an animal approaching the same over the runways, tiltable platforms normally closing the openings in the cover and each actuated by the weight of an animal thereon to tilt downwardly to project the animal into the receptacle, and a plurality of catches interrelated to be actuated to drop each platform either by movement of a bait or by the weight of an animal.

In testimony whereof, I affix my signature.

JULIAN BARANSKI.